United States Patent
Zhang et al.

(10) Patent No.: US 10,389,462 B2
(45) Date of Patent: Aug. 20, 2019

(54) DIGITAL SIGNAL PROCESSOR, TRANSMITTER, AND SYSTEM

(71) Applicant: HUAWEI TECHNOLOGIES CO., LTD., Shenzhen, Guangdong (CN)

(72) Inventors: Liang Zhang, Munich (DE); Tianjian Zuo, Shenzhen (CN); Enbo Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 116 days.

(21) Appl. No.: 15/722,369

(22) Filed: Oct. 2, 2017

(65) Prior Publication Data

US 2018/0026734 A1 Jan. 25, 2018

Related U.S. Application Data

(63) Continuation of application No. PCT/CN2015/076167, filed on Apr. 9, 2015.

(51) Int. Cl.
*H04J 1/02* (2006.01)
*H04B 10/556* (2013.01)
(Continued)

(52) U.S. Cl.
CPC ............ *H04J 1/02* (2013.01); *H04B 10/5561* (2013.01); *H04L 27/04* (2013.01); *H04L 27/2096* (2013.01)

(58) Field of Classification Search
CPC . H04B 10/5561; H04L 27/2096; H04L 27/04; H04J 1/02
See application file for complete search history.

(56) References Cited

U.S. PATENT DOCUMENTS 6,724,832 B1 * 4/2004 Hershberger ............ H03C 1/60
348/723
8,165,232 B2 4/2012 Moffatt et al.
(Continued)

FOREIGN PATENT DOCUMENTS

CN 1086062 4/1994
CN 101110650 A 1/2008
(Continued)

OTHER PUBLICATIONS

Extended European Search Report, dated Mar. 1, 2018, in European Application No. 15888155.7 (5 pp.).
(Continued)

*Primary Examiner* — Vinncelas Louis
(74) *Attorney, Agent, or Firm* — Staas & Halsey LLP

(57) ABSTRACT

The present invention discloses a digital signal processor, including: a signal generation unit, configured to generate a first digital signal and a second digital signal; a first modulation unit, configured to modulate the first digital signal to obtain a third digital signal; a second modulation unit, configured to modulate the second digital signal to obtain a fourth digital signal; a first phase shifting unit, configured to perform phase shifting on the third digital signal, to output the third digital signal and a fifth digital signal; a second phase shifting unit, configured to perform phase shifting on the fourth digital signal, to output the fourth digital signal and a sixth digital signal; an adder, configured to calculate a sum of the third digital signal and the fourth digital signal, to obtain a seventh digital signal; and a subtractor, configured to subtract the sixth digital signal from the fifth digital signal.

12 Claims, 5 Drawing Sheets

(51) Int. Cl.
*H04L 27/04* (2006.01)
*H04L 27/20* (2006.01)

(56) References Cited

U.S. PATENT DOCUMENTS

| | | | |
|---|---|---|---|
| 8,270,058 B1 | 9/2012 | Muenter et al. | |
| 2003/0189745 A1* | 10/2003 | Kikuchi | H04B 10/505 359/237 |
| 2008/0181620 A1 | 7/2008 | Sasaki | |
| 2009/0147341 A1 | 6/2009 | Muenter et al. | |
| 2010/0246710 A1 | 9/2010 | Nanri | |
| 2013/0010851 A1* | 1/2013 | Jaeger | H04L 27/04 375/224 |
| 2013/0191431 A1 | 7/2013 | Iyer et al. | |

FOREIGN PATENT DOCUMENTS

| | | |
|---|---|---|
| CN | 101232330 A | 7/2008 |
| CN | 101641922 A | 2/2010 |
| CN | 102307066 | 1/2012 |
| CN | 103218201 A | 7/2013 |
| CN | 103414514 | 11/2013 |
| CN | 103457902 A | 12/2013 |
| CN | 104019836 A | 9/2014 |
| EP | 2782270 | 9/2014 |

OTHER PUBLICATIONS

International Search Report dated Jan. 19, 2016 in corresponding International Patent Application No. PCT/CN2015/076167.
International Search Report, dated Jan. 19, 2016, in International Application No. PCT/CN2015/076167 (3 pp.).
Written Opinion of the International Searching Authority, dated Jan. 19, 2016, in International Application No. PCT/CN2015/076167 (7 pp.).
Chinese Office Action dated May 20, 2019 in corresponding Chinese Patent Application No. 201580078481.0 (6 pages).

* cited by examiner

DIGITAL SIGNAL PROCESSOR, TRANSMITTER, AND SYSTEM

CROSS-REFERENCE TO RELATED APPLICATIONS

This application is a continuation of International Application No. PCT/CN2015/076167, filed on Apr. 9, 2015, the disclosure of which is hereby incorporated by reference in its entirety.

TECHNICAL FIELD

The present invention relates to the field of communications technologies, and in particular, to a digital signal processor, a transmitter, and a system.

BACKGROUND

In recent years, short-range optical communication increases at a rate of 30% annually, and this rate will further accelerate along with continuous development of the mobile Internet. Exactly because of the great potential of the short-range optical communication, more attention is diverted from long-range optical communication to the short-range optical communication. In short-range application, people pay more attention to an Intensity Modulation/Direct Detection (IM/DD) technology. As a rate of a short-range system continuously increases, it is an inevitable trend that the rate increases from 25 Gbps to 100 Gbps for IM/DD. However, a currently available component bandwidth is only 25 GHz. Therefore, spectral efficiency needs to be improved, so that a transmission rate can reach 100 Gb/s.

As shown in FIG. 1, FIG. 1 a left and right sideband modulation method commonly used at present. On a first channel, a digital signal A is modulated into a single sideband digital signal a, and a carrier frequency is $f_m$.

$$a = A*\cos(2*\pi*f_m*t) + \hat{A}*\sin(2*\pi*f_m*t)$$

Likewise, on a second channel, a digital signal B is modulated into a single sideband digital signal b, and a carrier frequency is $f_m$.

$$b = B*\cos(2*\pi*f_m*t) + \hat{B}*\sin(2*\pi*f_m*t)$$

The digital signals a and b are modulated into an optical carrier by means of phase shifting and digital-to-analog conversion, to obtain left and right sideband digital signals in an optical domain, as shown in FIG. 2. A left sideband carries information about a, and a right sideband carries information about b. It can be learned that, in this solution, a spectrum is seriously wasted, and spectral efficiency is low.

SUMMARY

Embodiments of the present invention provide a digital signal processor. Two different types of signals are generated to separately drive a single sideband modulator, to generate independent optical signals on left and right sidebands. This doubles spectrum utilization and component bandwidth utilization, thereby improving a capacity of an optical transmission system.

According to a first aspect, a digital signal processor is provided, including:

a signal generation unit, configured to generate a first digital signal and a second digital signal;

a first modulation unit, configured to modulate the first digital signal to obtain a third digital signal;

a second modulation unit, configured to modulate the second digital signal to obtain a fourth digital signal;

a first phase shifting unit, configured to perform phase shifting on the third digital signal, to output the third digital signal and a fifth digital signal, where the fifth digital signal is a signal obtained after phase shifting is performed on the third digital signal;

a second phase shifting unit, configured to perform phase shifting on the fourth digital signal, to output the fourth digital signal and a sixth digital signal, where the sixth digital signal is a signal obtained after phase shifting is performed on the fourth digital signal;

an adder, configured to calculate a sum of the third digital signal and the fourth digital signal, to obtain a seventh digital signal, where the seventh digital signal is a first drive signal used to drive a single sideband modulator; and a subtractor, configured to subtract the sixth digital signal from the fifth digital signal, to obtain an eighth digital signal, where the eighth digital signal is a second drive signal used to drive the single sideband modulator.

According to a second aspect, an embodiment of the present invention provides a transmitter, including the foregoing digital signal processor, a first digital-to-analog converter, a second digital-to-analog converter, a light source, and a single sideband modulator, where the first digital-to-analog converter is configured to convert the seventh digital signal into an analog signal, the second digital-to-analog converter is configured to convert the eighth digital signal into an analog signal, the light source is configured to generate contiguous optical carriers, and the single sideband modulator is configured to modulate the optical carriers according to the analog signal of the seventh digital signal and the analog signal of the eighth digital signal, to generate independent optical signals on left and right sidebands.

According to a third aspect, an embodiment of the present invention provides an optical transmission system, including the foregoing transmitter.

According to a fourth aspect, an embodiment of the present invention provides a digital signal processing method, including the following steps:

generating a first digital signal and a second digital signal;

modulating the first digital signal to obtain a third digital signal;

modulating the second digital signal to obtain a fourth digital signal;

performing phase shifting on the third digital signal, to output the third digital signal and a fifth digital signal, where the fifth digital signal is a signal obtained after phase shifting is performed on the third digital signal;

performing phase shifting on the fourth digital signal, to output the fourth digital signal and a sixth digital signal, where the sixth digital signal is a signal obtained after phase shifting is performed on the fourth digital signal;

calculating a sum of the third digital signal and the fourth digital signal, to obtain a seventh digital signal, where the seventh digital signal is a first drive signal used to drive a single sideband modulator; and subtracting the sixth digital signal from the fifth digital signal, to obtain an eighth digital signal, where the eighth digital signal is a second drive signal used to drive the single sideband modulator.

According to a fifth aspect, an embodiment of the present invention provides a data communications apparatus, where the apparatus includes a processor, a memory, and a bus system, the processor and the memory are connected by using the bus system, the memory is configured to store an instruction, and the processor is configured to execute the instruction stored in the memory, where the processor is configured to: modulate a first digital signal to obtain a second digital signal; and modulate a third digital signal to obtain a fourth digital signal; perform phase shifting on the second digital signal, to output the second digital signal and a fifth digital signal, where the fifth digital signal is a signal obtained after phase shifting is performed on the second digital signal; perform phase shifting on the fourth digital signal, to output the fourth digital signal and a sixth digital signal, where the sixth digital signal is a signal obtained after phase shifting is performed on the fourth digital signal; calculate a sum of the first digital signal and the second digital signal, to obtain a seventh digital signal, where the seventh digital signal is a first drive signal used to drive a single sideband modulator; and subtract the sixth digital signal from the fifth digital signal, to obtain an eighth digital signal, where the eighth digital signal is a second drive signal used to drive the single sideband modulator.

Based on the foregoing technical solutions, the digital signal processor in the embodiments of the present invention generates a first digital signal and a second digital signal; modulates the first digital signal to obtain a third digital signal; modulates the second digital signal to obtain a fourth digital signal; performs phase shifting on the third digital signal, to output the third digital signal and a fifth digital signal, where the fifth digital signal is a signal obtained after phase shifting is performed on the third digital signal; performs phase shifting on the fourth digital signal, to output the fourth digital signal and a sixth digital signal, where the sixth digital signal is a signal obtained after phase shifting is performed on the fourth digital signal; calculates a sum of the third digital signal and the fourth digital signal, to obtain a seventh digital signal, where the seventh digital signal is a first drive signal used to drive a single sideband modulator; and subtracts the sixth digital signal from the fifth digital signal, to obtain an eighth digital signal, where the eighth digital signal is a second drive signal used to drive the single sideband modulator. In the embodiments of the present invention, spectrum utilization and component bandwidth utilization can be doubled, thereby improving a capacity of an optical transmission system.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 3:
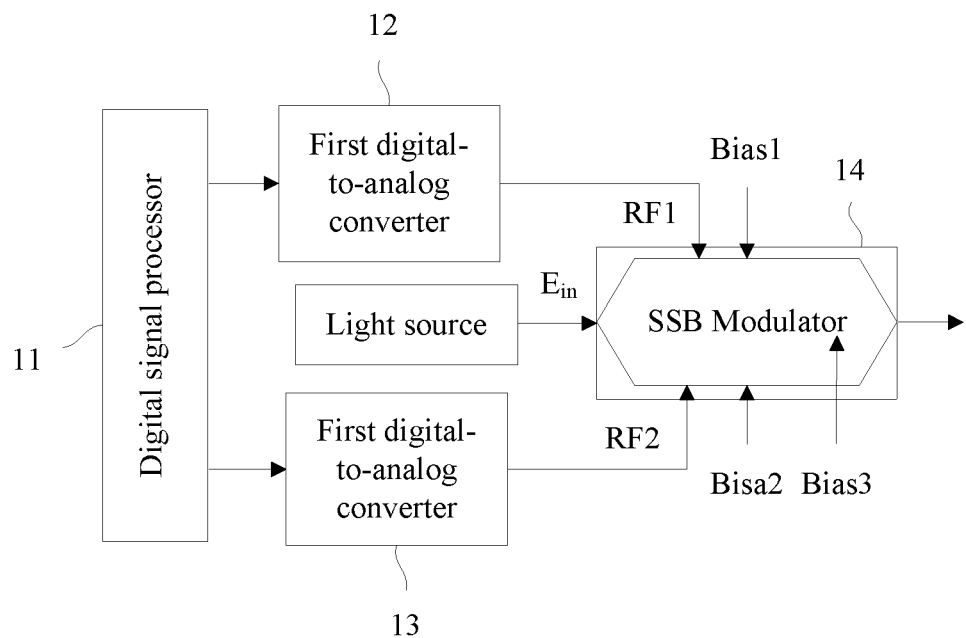
FIG. 3 is a functional block diagram of a transmitter in an optical transmission system according to an embodiment of the present invention.

The present invention is applied to an optical transmission system. The system includes a transmitter and a receiver. A signal sent by the transmitter is transmitted to the receiver by using an optical fiber. The transmitter includes a digital signal generator and a single sideband modulator, as shown in FIG. 3. An improvement of the present invention lies in the digital signal generator. By using different circuit design, the digital signal generator generates two different types of signals that separately drive a single sideband modulator, to further generate independent optical signals on left and right sidebands. In comparison with the prior art, spectrum utilization and component bandwidth utilization can be doubled, thereby improving a capacity of a transmission system.

Figure 4:
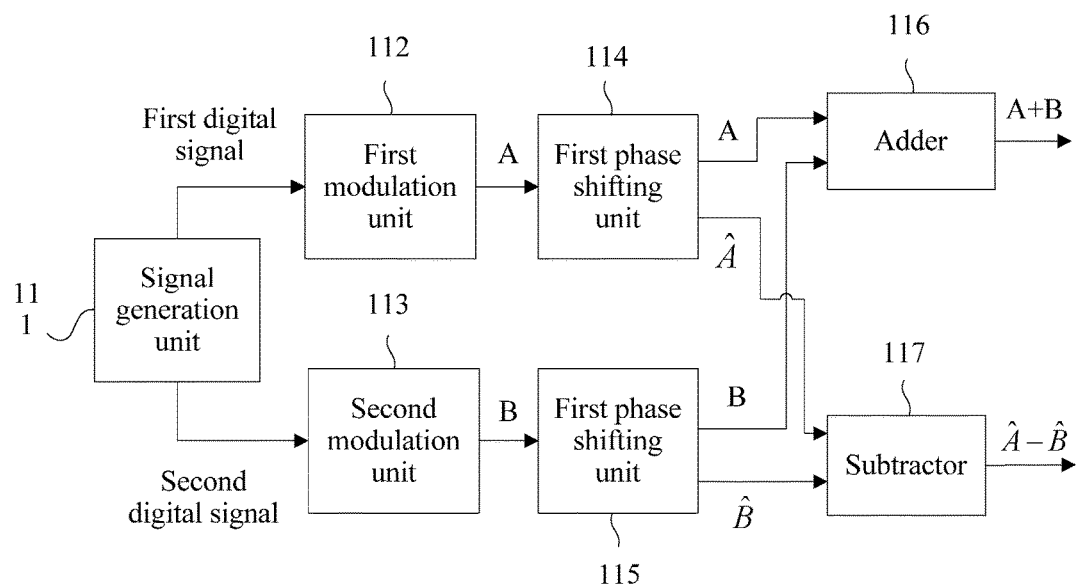
FIG. 4 is a functional block diagram of a digital signal processor in a transmitter according to an embodiment of the present invention.
Figure 5:
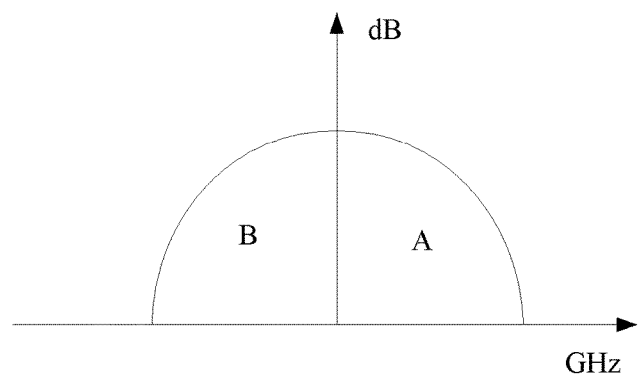
FIG. 5 is a schematic diagram of a spectrum of left and right sideband signals generated by the transmitter shown in FIG. 3.

As shown in FIG. 4, a digital signal generator 11 provided in an embodiment of the present invention includes: a signal generation unit 111, configured to generate a first digital signal and a second digital signal; a first modulation unit 112, configured to modulate the first digital signal to obtain a third digital signal; a second modulation unit 113, configured to modulate the second digital signal to obtain a fourth digital signal; a first phase shifting unit 114, configured to perform phase shifting on the third digital signal, to output the third digital signal and a fifth digital signal, where the fifth digital signal is a signal obtained after phase shifting is performed on the third digital signal; a second phase shifting unit 115, configured to perform phase shifting on the fourth digital signal, to output the fourth digital signal and a sixth digital signal, where the sixth digital signal is a signal obtained after phase shifting is performed on the fourth digital signal; an adder 116, configured to calculate a sum of the first digital signal and the second digital signal, to obtain a seventh digital signal, where the seventh digital signal is a first drive signal used to drive a single sideband modulator; and a subtractor 117, configured to subtract the sixth digital signal from the fifth digital signal, to obtain an eighth digital signal, where the eighth digital signal is a second drive signal used to drive the single sideband modulator.

The signal generation unit 111 specifically includes: a pseudo-random sequence generation unit, configured to generate a pseudo-random sequence; and a serial-to-parallel conversion unit, configured to perform serial-to-parallel conversion on the pseudo-random sequence, to divide the pseudo-random sequence into two signals: the first digital signal and the second digital signal. The pseudo-random sequence generation unit is a pseudo-random binary sequence generation unit. The first digital signal and the second digital signal are binary digital signals.

The first modulation unit 111 and the second modulation unit 112 support multiple modulation schemes, which may be, for example, a Carrierless Amplitude/Phase Modulation (CAP) or Discrete Multi-Tone (DMT) modulation scheme.

It should be noted that, to prevent relatively serious crosstalk, near a zero frequency, between obtained left and right sideband signals in left and right sidebands, in this embodiment, when the first digital signal and the second digital signal are modulated, guard space including several subcarriers is preset at a zero-frequency to low-frequency part of each of the first digital signal and the second digital signal. A quantity of subcarriers is determined according to an actual optimal case.

Preferably, in this embodiment, both the first phase shifting unit 113 and the second phase shifting unit 114 are Hilbert transformers. The fifth digital signal is a signal obtained after the third digital signal is phase-shifted by 90°. The sixth digital signal is a signal obtained after the fourth digital signal is phase-shifted by 90°.

Figure 1:
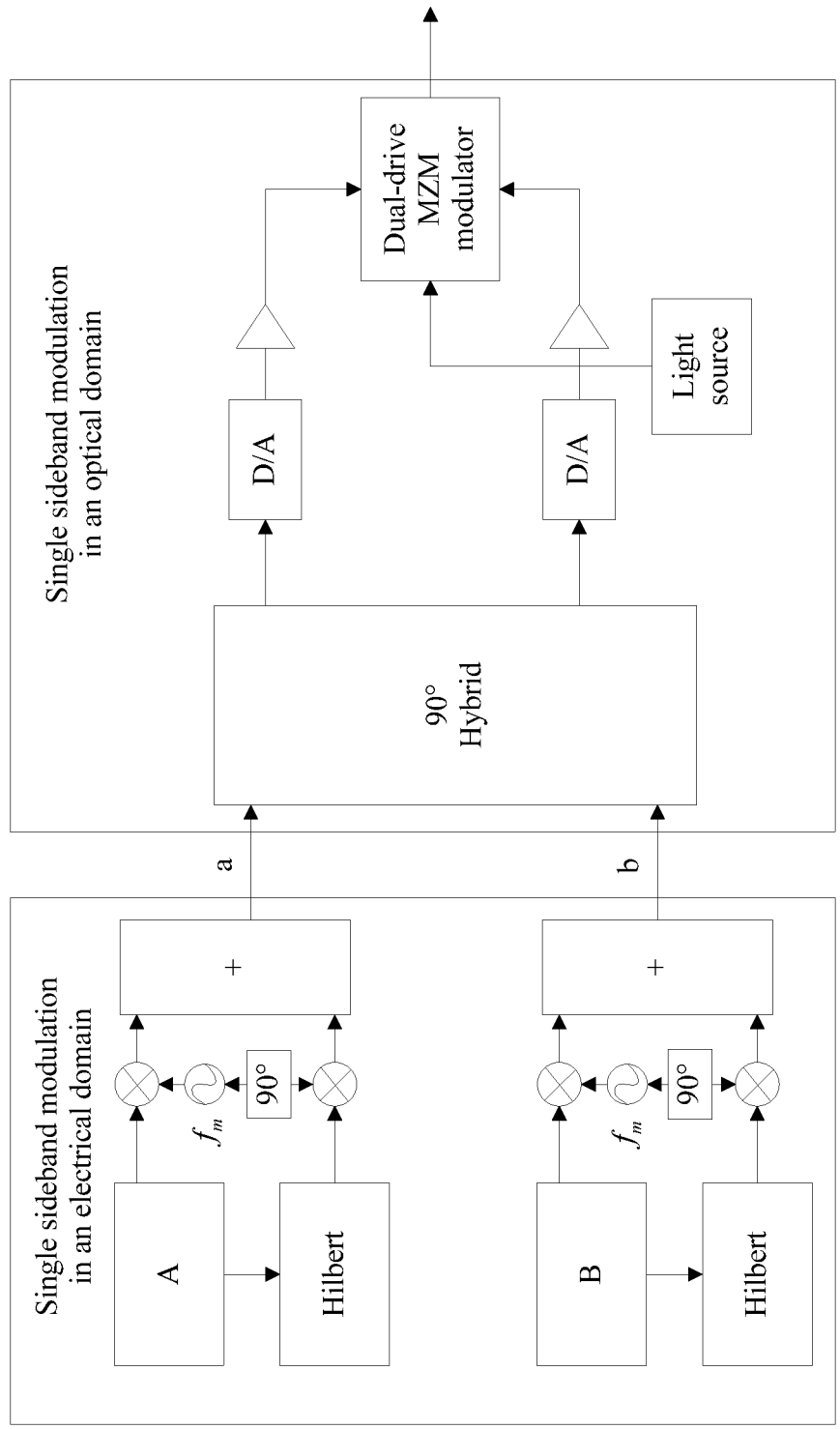
FIG. 1 is a functional block diagram of a transmitter that generates left and right sideband signals in the prior art.
Figure 2:
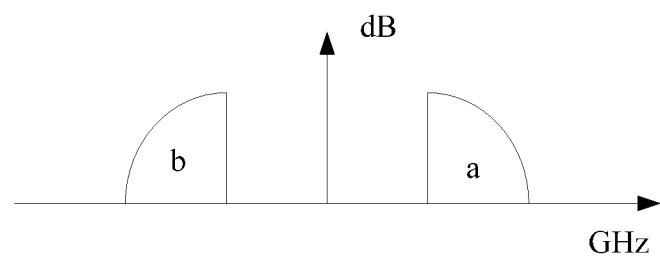
FIG. 2 is a schematic diagram of a spectrum of left and right sideband signals generated by the transmitter shown in FIG. 1.

As shown in FIG. 2, an embodiment of the present invention further discloses a transmitter. The transmitter 100 includes a signal generator 11, a first digital-to-analog converter 12, a second digital-to-analog converter 13, a light source 14, and a single sideband modulator (SSB Modulator) 15. The signal generator 11 is configured to generate the seventh digital signal and the eighth digital signal described in the foregoing embodiment. The first digital-to-analog converter 12 is configured to convert the seventh digital signal into an analog signal. The second digital-to-analog converter 13 is configured to convert the eighth digital signal into an analog signal. The light source 14 outputs a channel of continuous light to a light input port of the single sideband modulator 15. The single sideband modulator 15 modulates the optical carriers according to the analog signal of the seventh digital signal and the analog signal of the eighth digital signal, to generate independent optical signals on left and right sidebands.

Assuming that a third digital signal is A and a fourth digital signal is B, a fifth signal is $\hat{A}$, and a sixth signal is $\hat{B}$. $\hat{A}$ is a signal obtained after the fourth digital signal A is phase-shifted by 90°, and $\hat{B}$ is a signal obtained after the fifth digital signal B is phase-shifted by 90°. In this case, the seventh digital signal is equal to A+B, and the eighth signal is equal to $\hat{A}-\hat{B}$.

In an embodiment, a single sideband modulator 150 includes a first Mach-Zehnder Modulator (MZM) and a second MZM that are parallel with one on the top and one on the bottom. The first MZM has a first radio frequency port and a first bias port, and the second MZM has a second radio frequency port and a second bias port. A phase difference between the first MZM and the second MZM is controlled by using a third bias port.

The analog signal of the seventh digital signal is input to the first radio frequency port of the first MZM, and the analog signal of the eighth digital signal is input to the second radio frequency port of the second MZM. When the first bias port bias1, the second bias port bias2, and the third bias port bias3 of the single sideband modulator 150 are respectively controlled to be biased at 135°, 135°, and 90°, a strength $E_{out}$ of an output light field may be represented as:

$$E_{out}=E_{in}*[1+(A+B)+j*(\hat{A}-\hat{B})]=E_{in}*[1+(A+j*\hat{A})+(B+j*\hat{B})], \text{ where}$$

$E_{in}$ is a light field strength of an optical signal output by the light source 14. It can be learned from the foregoing formula that output light includes a direct-current carrier component 1, a right sideband digital signal (A+j*$\hat{A}$), and a left sideband digital signal (B+j*$\hat{B}$) where A is a real part of the right sideband digital signal, and $\hat{A}$ is an imaginary part of the right sideband digital signal, B is a real part of the left sideband digital signal, and $\hat{B}$ is an imaginary part of the left sideband digital signal. Left and right sidebands carry independent digital signals A and B, respectively. In this embodiment of the present invention, spectrum utilization and component bandwidth utilization can be doubled, thereby improving a capacity of a transmission system, so that a single carrier can support a rate of 100 G.

Figure 6:
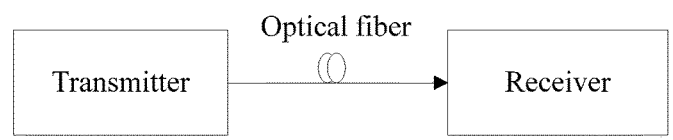
FIG. 6 is a functional block diagram of an optical transmission system according to an embodiment of the present invention.

Based on the foregoing disclosed transmitter, as shown in FIG. 6, the present invention further discloses an optical transmission system, including the foregoing transmitter and a receiver. A digital signal output by the transmitter is transmitted and output to the receiver by using an optical fiber.

Figure 7:
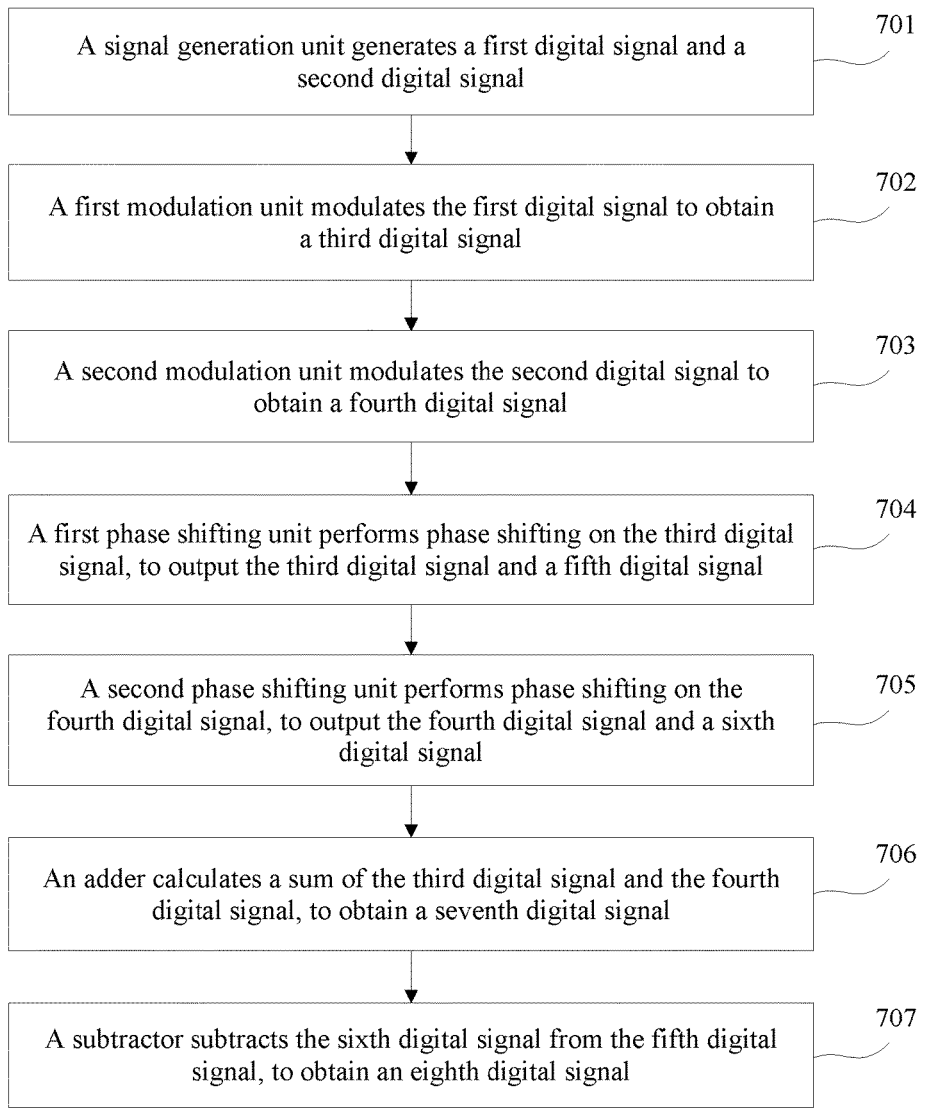
FIG. 7 is a flowchart of a digital signal processing method according to an embodiment of the present invention.

As shown in FIG. 7, the present invention further discloses a digital signal processing method, including the following steps.

Step 701: A signal generation unit generates a first digital signal and a second digital signal.

In an embodiment, the signal generation unit first generates a pseudo-random sequence, and then performs serial-to-parallel conversion on the pseudo-random sequence, to divide the pseudo-random sequence into two signals: the first digital signal and the second digital signal. Preferably, the pseudo-random sequence generation unit is a pseudo-random binary sequence generation unit. The first digital signal and the second digital signal are binary digital signals.

Step 702: A first modulation unit modulates the first digital signal to obtain a third digital signal.

There are multiple modulation schemes, which may be, for example, a Carrierless Amplitude/Phase Modulation (CAP) or Discrete Multi-Tone (DMT) modulation scheme.

Step 703: A second modulation unit modulates the second digital signal to obtain a fourth digital signal.

There are multiple modulation schemes, which may be, for example, a CAP or DMT modulation scheme.

In the foregoing steps 702 and 703, to prevent relatively serious crosstalk, near a zero frequency, between obtained left and right sideband signals in left and right sidebands, guard space including several subcarriers is preset at a zero-frequency to low-frequency part of each of the first digital signal and the second digital signal.

Step 704: A first phase shifting unit performs phase shifting on the third digital signal, to output the third digital signal and a fifth digital signal, where the fifth digital signal is a signal obtained after phase shifting is performed on the third digital signal.

Preferably, the fifth digital signal is a signal obtained after the third digital signal is phase-shifted by 90°.

Step 705: A second phase shifting unit performs phase shifting on the fourth digital signal, to output the fourth digital signal and a sixth digital signal, where the sixth digital signal is a signal obtained after phase shifting is performed on the fourth digital signal.

Preferably, the sixth digital signal is a signal obtained after the fourth digital signal is phase-shifted by 90°.

Step 706: An adder calculates a sum of the third digital signal and the fourth digital signal, to obtain a seventh digital signal, where the seventh digital signal is a first drive signal used to drive a single sideband modulator.

Step 707: A subtractor subtracts the sixth digital signal from the fifth digital signal, to obtain an eighth digital signal, where the eighth digital signal is a second drive signal used to drive the single sideband modulator.

In this embodiment of the present invention, the foregoing steps are performed. This can double spectrum utilization and component bandwidth utilization, thereby improving a capacity of a transmission system, so that a single carrier can support a rate of 100 G.

Figure 8:
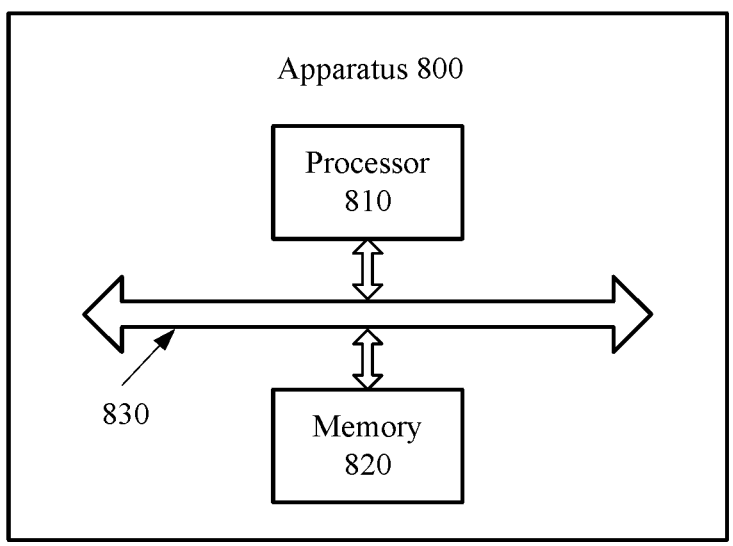
FIG. 8 is a functional block diagram of a data communications apparatus according to an embodiment of the present invention.

According to the foregoing embodiments, an embodiment of the present invention further discloses a data communications apparatus 800. As shown in FIG. 8, the apparatus includes a processor 810, a memory 820, and a bus system 830. The processor 810 and the memory 820 are connected by using the bus system 830. The memory 820 is configured to store an instruction, and the processor 810 is configured to execute the instruction stored in the memory 820.

The processor 810 is configured to modulate a first digital signal to obtain a second digital signal; and modulate a third digital signal to obtain a fourth digital signal; perform phase shifting on the second digital signal, to output the second digital signal and a fifth digital signal, where the fifth digital signal is a signal obtained after phase shifting is performed on the second digital signal; perform phase shifting on the fourth digital signal, to output the fourth digital signal and a sixth digital signal, where the sixth digital signal is a signal obtained after phase shifting is performed on the fourth digital signal; calculate a sum of the third digital signal and the fourth digital signal, to obtain a seventh digital signal, where the seventh digital signal is a first drive signal used to drive a single sideband modulator; and subtract the sixth digital signal from the fifth digital signal, to obtain an eighth digital signal, where the eighth digital signal is a second drive signal used to drive the single sideband modulator.

According to the foregoing embodiments, in the present invention, spectrum utilization and component bandwidth utilization can be doubled, thereby improving a capacity of a transmission system, so that a single carrier can support a rate of 100 G.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A digital signal processor, comprising:
   a signal generation unit, configured to generate a first digital signal and a second digital signal;
   a first modulation unit, configured to modulate the first digital signal to obtain a third digital signal;
   a second modulation unit, configured to modulate the second digital signal to obtain a fourth digital signal;
   a first phase shifting unit, configured to perform phase shifting on the third digital signal, to output the third digital signal and a fifth digital signal, wherein the fifth digital signal is a signal obtained after phase shifting is performed on the third digital signal;
   a second phase shifting unit, configured to perform phase shifting on the fourth digital signal, to output the fourth digital signal and a sixth digital signal, wherein the sixth digital signal is a signal obtained after phase shifting is performed on the fourth digital signal;
   an adder, configured to calculate a sum of the third digital signal and the fourth digital signal, to obtain a seventh digital signal, wherein the seventh digital signal is a first drive signal used to drive a single sideband modulator; and a subtractor, configured to subtract the sixth digital signal from the fifth digital signal, to obtain an eighth digital signal, wherein the eighth digital signal is a second drive signal used to drive the single sideband modulator.

2. The digital signal processor according to claim 1, wherein when modulating the first digital signal, the first modulation unit further presets, at a zero-frequency to low-frequency part of the first digital signal, guard space comprising several subcarriers; and when modulating the second digital signal, the second modulation unit further presets, at a zero-frequency to low-frequency part of the second digital signal, guard space comprising several subcarriers.

3. The digital signal processor according to claim 1, wherein the signal generation unit specifically comprises:
a pseudo-random sequence generation unit, configured to generate a pseudo-random sequence; and
a serial-to-parallel conversion unit, configured to convert the pseudo-random sequence to obtain the first digital signal and the second digital signal.

4. The digital signal processor according to claim 3, wherein the pseudo-random sequence generation unit is a pseudo-random binary sequence generation unit.

5. A digital signal processing method, comprising the following steps:
generating a first digital signal and a second digital signal;
modulating the first digital signal to obtain a third digital signal;
modulating the second digital signal to obtain a fourth digital signal;
performing phase shifting on the third digital signal, to output the third digital signal and a fifth digital signal, wherein the fifth digital signal is a signal obtained after phase shifting is performed on the third digital signal;
performing phase shifting on the fourth digital signal, to output the fourth digital signal and a sixth digital signal, wherein the sixth digital signal is a signal obtained after phase shifting is performed on the fourth digital signal;
calculating a sum of the third digital signal and the fourth digital signal, to obtain a seventh digital signal, wherein the seventh digital signal is a first drive signal used to drive a single sideband modulator; and
subtracting the sixth digital signal from the fifth digital signal, to obtain an eighth digital signal, wherein the eighth digital signal is a second drive signal used to drive the single sideband modulator.

6. The method according to claim 5, further comprising the following steps:
presetting, at a zero-frequency to low-frequency part of the first digital signal, guard space comprising several subcarriers; and
presetting, at a zero-frequency to low-frequency part of the second digital signal, guard space comprising several subcarriers.

7. A data communications apparatus, wherein the apparatus comprises a processor, a memory, and a bus system, the processor and the memory are connected by using the bus system, the memory is configured to store an instruction, and the processor is configured to execute the instruction stored in the memory, wherein
the processor is configured to: modulate a first digital signal to obtain a third digital signal; and modulate a second digital signal to obtain a fourth digital signal; perform phase shifting on the third digital signal, to output the third digital signal and a fifth digital signal, wherein the fifth digital signal is a signal obtained after phase shifting is performed on the third digital signal; perform phase shifting on the fourth digital signal, to output the fourth digital signal and a sixth digital signal, wherein the sixth digital signal is a signal obtained after phase shifting is performed on the fourth digital signal; calculate a sum of the third digital signal and the fourth digital signal, to obtain a seventh digital signal, wherein the seventh digital signal is a first drive signal used to drive a single sideband modulator; and subtract the sixth digital signal from the fifth digital signal, to obtain an eighth digital signal, wherein the eighth digital signal is a second drive signal used to drive the single sideband modulator.

8. The data communication apparatus according to claim 7, wherein when modulating the first digital signal, the processor further presets, at a zero-frequency to low-frequency part of the first digital signal, guard space comprising several subcarriers; and when modulating the second digital signal, the processor further presets, at a zero-frequency to low-frequency part of the second digital signal, guard space comprising several subcarriers.

9. A transmitter, comprising a digital signal processor, a first digital-to-analog converter, a second digital-to-analog converter, a light source, and a single sideband modulator, wherein
the digital signal processor is configured to:
generate a first digital signal and a second digital signal;
modulate the first digital signal to obtain a third digital signal;
modulate the second digital signal to obtain a fourth digital signal;
perform phase shifting on the third digital signal, to output the third digital signal and a fifth digital signal, wherein the fifth digital signal is a signal obtained after phase shifting is performed on the third digital signal;
perform phase shifting on the fourth digital signal, to output the fourth digital signal and a sixth digital signal, wherein the sixth digital signal is a signal obtained after phase shifting is performed on the fourth digital signal;
calculate a sum of the third digital signal and the fourth digital signal, to obtain a seventh digital signal, wherein the seventh digital signal is a first drive signal used to drive a single sideband modulator; and
subtract the sixth digital signal from the fifth digital signal, to obtain an eighth digital signal, wherein the eighth digital signal is a second drive signal used to drive the single sideband modulator;
the first digital-to-analog converter is configured to convert the seventh digital signal into an analog signal, the second digital-to-analog converter is configured to convert the eighth digital signal into an analog signal, the light source is configured to generate contiguous optical carriers, and the single sideband modulator is configured to modulate the optical carriers according to the analog signal of the seventh digital signal and the analog signal of the eighth digital signal, to generate an optical signal on a left sideband and an optical signal on a right sideband that are independent from each other.

10. The transmitter according to claim 9, wherein the single sideband modulator comprises a first modulator and a second modulator, the first modulator has a first radio frequency port and a first bias port, the second modulator has a second radio frequency port and a second bias port, the first radio frequency port receives the analog signal of the seventh digital signal, and the second radio frequency port receives the analog signal of the eighth digital signal.

11. The transmitter according to claim 10, wherein the single sideband modulator further comprises a third bias port, and a phase difference between the first modulator and the second modulator is controlled by using the third bias port.

12. The transmitter according to claim 11, wherein bias angles of the first bias port and the second bias port are 135°, and a bias angle of the third bias port is 90°.

\* \* \* \* \*